(12) United States Patent
Kling et al.

(10) Patent No.: US 7,512,630 B2
(45) Date of Patent: *Mar. 31, 2009

(54) SYSTEM AND METHOD FOR ARCHIVING PROCESS COMPONENT IS ADAPTED TO LISTEN FOR A QUERY FOR A MISSING DATA PACKET FROM A REQUESTING CLIENT COMPUTER TO READ, RETRIEVE AND RETURN THE DATA PACKET CORRESPONDING TO THE REFERENCED SEQUENCE NUMBER TO THE REQUESTING CLIENT COMPUTER

(75) Inventors: Brian D. Kling, Branchburg, NJ (US); Howard W. Fingerhut, Mendham, NJ (US); Jeffrey D. Kashinsky, Morristown, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 428 days.

This patent is subject to a terminal disclaimer.

(21) Appl. No.: 11/202,823

(22) Filed: Aug. 12, 2005

(65) Prior Publication Data

US 2006/0004884 A1    Jan. 5, 2006

(51) Int. Cl.
*G06F 17/00* (2006.01)
*G06F 15/177* (2006.01)
*G06F 15/173* (2006.01)
*G06F 17/30* (2006.01)

(52) U.S. Cl. ............ 707/103 X; 707/10; 707/204; 709/220; 709/226

(58) Field of Classification Search ......... 709/215–222, 709/235–240, 226, 230–234, 203, 205; 370/352, 370/407; 707/10, 100, 102, 103 R–103 Z, 707/204
See application file for complete search history.

(56) References Cited

U.S. PATENT DOCUMENTS

| 5,519,704 | A | * | 5/1996 | Farinacci et al. | 370/402 |
|---|---|---|---|---|---|
| 5,918,002 | A | * | 6/1999 | Klemets et al. | 714/18 |
| 6,031,818 | A | * | 2/2000 | Lo et al. | 370/216 |
| 6,076,114 | A | * | 6/2000 | Wesley | 709/235 |
| 6,091,709 | A | * | 7/2000 | Harrison et al. | 370/235 |
| 6,141,785 | A | * | 10/2000 | Hur et al. | 714/748 |
| 6,181,704 | B1 | * | 1/2001 | Drottar et al. | 370/410 |
| 6,246,684 | B1 | * | 6/2001 | Chapman et al. | 370/394 |

(Continued)

FOREIGN PATENT DOCUMENTS

| EP | 0825738 | * | 2/1998 |
|---|---|---|---|
| WO | WO 99/07124 | * | 2/1999 |
| WO | WO9950990 | * | 10/1999 |
| WO | WO 03/096600 | * | 11/2003 |
| WO | WO 2007/129856 | * | 11/2007 |

OTHER PUBLICATIONS

Joe Macker:, "The Multicast Dissemination Protocol (MDP) version 1 Framework", Apr. 1996 12 pages.*

*Primary Examiner*—Srirama Channavajjala
(74) *Attorney, Agent, or Firm*—Withers & Keys, LLC

(57) ABSTRACT

A system and method for data distribution and recovery, including a server that broadcasts data to a plurality of clients and a means for a client to identify and recover broadcast data that the client missed while it was off line. In a representative embodiment, the system includes a transfer server, a plurality of clients in communication with the transfer server, and an archive in communication with the transfer server and the plurality of clients. The transfer server receives data packets from a data source, uniquely identifies each data packet, and broadcasts the data packets to the plurality of clients and the archive. Each client receives the data broadcast from the transfer server, identifies missing data, and communicates with the archive to recover the missing data.

13 Claims, 5 Drawing Sheets

U.S. PATENT DOCUMENTS

| | | |
|---|---|---|
| 6,381,215 B1 * | 4/2002 | Hamilton et al. ............ 370/236 |
| 6,445,717 B1 * | 9/2002 | Gibson et al. ............... 370/473 |
| 6,629,285 B1 * | 9/2003 | Gerendai et al. ............ 714/748 |
| 6,717,947 B1 * | 4/2004 | Ghodrat et al. .......... 370/395.1 |
| 6,760,860 B1 * | 7/2004 | Fong et al. .................... 714/4 |
| 6,965,916 B1 * | 11/2005 | Kling et al. ................. 709/205 |
| 7,068,644 B1 * | 6/2006 | McConnell et al. ......... 370/352 |
| 7,233,573 B2 * | 6/2007 | Walls et al. ................. 370/236 |
| 2001/0034788 A1 * | 10/2001 | McTernan et al. ........... 709/232 |
| 2005/0180327 A1 * | 8/2005 | Banerjee et al. ............. 370/236 |

\* cited by examiner

SYSTEM AND METHOD FOR ARCHIVING PROCESS COMPONENT IS ADAPTED TO LISTEN FOR A QUERY FOR A MISSING DATA PACKET FROM A REQUESTING CLIENT COMPUTER TO READ, RETRIEVE AND RETURN THE DATA PACKET CORRESPONDING TO THE REFERENCED SEQUENCE NUMBER TO THE REQUESTING CLIENT COMPUTER

BACKGROUND

1. Field of the Invention

The present invention relates to the distribution of data, and, in particular, to a system and method for transferring data from one sender location to multiple receiving locations and for enabling a receiving location to recover data previously distributed when the receiving location was disabled.

2. Background of the Invention

The client-server model is a popular technique for efficiently sharing and distributing data among a network of computers. In a typical client-server system architecture, one computer acts as the "back end" or server, which performs complex tasks. Other, smaller computers or terminals act as the "front-end" or clients, which communicate with a user and typically perform other, less complex tasks. The client requests data from the server. A client is defined as a requester of services and a server is defined as the provider of services. A single machine can be both a client and a server depending on the software configuration.

FIG. 1 illustrates a client-server architecture in which a transfer server 100 receives data from a data source 102 and distributes the data to data processing clients 104. Typically, transfer server 100 distributes the data from data source 102 by transferring data files to the multiple clients 104 in separate point-to-point communications 110 using, for example, File Transfer Protocol (FTP). In turn, clients 104 read, manipulate, and analyze the data in different ways to provide network users with various forms of useful information.

As an example of this client-server data distribution, data source 102 could be the network control center (NCC) of a digital wireless packet switching network. As such, data source 102 could provide continuous performance log files including data such as network capacity, regional traffic data, and alarms indicating network areas experiencing overload conditions. Transfer server 100 would copy these performance log files to each of the clients 104, which would then analyze the data in different ways and present network users with different aspects of network performance. After viewing the network performance, a network user (e.g., a systems engineer) could then make operational adjustments to improve the performance of the digital wireless network.

In a sizeable digital wireless packet switching network, large amounts of data continuously enter the network control center. Indeed, it is not uncommon to transfer over a gigabyte of data per day, as is the case with the Mobitex digital wireless data network of BellSouth Wireless Data (Woodbridge, N.J.). Therefore, transfer server 100 must continually copy data in point-to-point FTP transfers to each of clients 104. In addition, although FIG. 1 shows only three clients 104 for simplicity, an actual digital wireless packet switching network requires numerous clients to monitor the many aspects of network performance, as is represented by the labels 1,2, . . . N of clients 104. Thus, transfer server 100 is almost continually occupied with file transfers, burdening not only its resources, but network bandwidth as well.

This method of data distribution further strains the resources of transfer server 100 when a client is unable to accept a data transfer, for example, when a client experiences a catastrophic error and crashes. In such a situation, transfer server 100 cannot copy the data to the disabled client, and instead must create a directory and store the data until the disabled client is back on line. In this manner, transfer server 100 can preserve the integrity of the analyses performed by the client by restoring the disabled client with the data that it missed while it was off line. However, in doing so, transfer server 100 must reserve considerable storage and processing capacity for responding to the disabled client's request for historical data. With one gigabyte of data processed per day, for example, transfer server 100 then risks consuming its own disk space and also crashing.

To reduce network bandwidth consumption and to ease the burden on transfer server 100, many network administrators have turned to broadcast and multicast messaging software to distribute data from a server to a group of clients. A broadcast transmission delivers a message to all clients and servers within a network, and is analogous to a radio station broadcasting audio content to a number of tuned-in radios. A multicast transmission delivers a message to a specific subset of the clients and servers within a network. As used herein, "broadcast" means to transmit a message from a single network component (e.g., a client) to all network components (e.g., clients and servers) with which the single network component is in communication. Also, as used herein, "multicast" is a form of broadcast, in which a single network component transmits a message to a group of network components, but not necessarily all network components.

As shown in FIG. 2, the broadcast and multicast approaches eliminate the repetitive point-to-point communications between transfer server 100 and clients 104. Instead, the broadcast and multicast messaging software enables server 100 to broadcast a single data transfer 200 that is received by all of the clients 104 at the same time. An example of this type of messaging software is TIB Rendezvous™ by TIBCO™ of Palo Alto, Calif. Another example of suitable messaging software is Transaction Control Protocol/Internet Protocol (TCP/IP), in which datagrams can be used to broadcast or multicast messages. In addition to broadcast and multicast messaging, these types of messaging software also support the traditional point-to-point communications.

In the example of FIG. 2, messaging software runs on transfer server 100. Correspondingly, client computers 104 run a viewer of the messaging software of server 100. Using the messaging software, server 100 can broadcast a single communication 200 to clients 1,2, . . . N of clients 104 instead of completing multiple point-to-point communications to each individual client. In addition to a broadcast, server 100 could also multicast a single message to, for example, clients 1 and 2 of clients 104, but not to client N.

Overall, this broadcast and multicast messaging technology minimizes the computing and communication responsibilities of the server. Despite serving multiple clients, the server need only process data once and send a single message. In addition, this broadcast/multicast technique reduces network bandwidth consumption by limiting the number of transmissions.

Despite minimizing network usage and the processing responsibilities of transfer server 100, the broadcast and multicast messaging software presents problems with guaranteeing reliable data transfers to the clients. Specifically, because the broadcast transfer is point-to-multipoint, the sender (transfer server 100) does not know whether the message has been received by all of the listeners (clients 104). This condition is analogous to a radio station not being able to recognize how many radios are tuned-in, and, particularly, whether a specific radio has missed a broadcast. (A system administrator could address this problem by having clients 104 return acknowledgement messages for each received message. However, this technique would consume considerable network capacity in just sending acknowledgements.)

Thus, when transfer server 100 broadcasts the message, if one of clients 104 is off line because of, for example, a power failure, a network failure, or some other unforeseen circumstance, that disabled client does not receive the data. Moreover, to preserve the resources of transfer server 100, transfer server 100 broadcasts the data only once and subsequently deletes the data to save its disk space. Thus, if a disabled client misses the single broadcast, the client has lost the data forever. Furthermore, even if the data is stored in a directory as with the traditional point-to-point transmissions described above, when the client comes back on line, it has no way of determining which or how many data messages it has missed. Thus, a client is left with incomplete data, thereby compromising its performance.

SUMMARY OF THE INVENTION

The present invention provides a system and method for data distribution that minimizes the number of data transmissions, preserves network bandwidth, and enables a client to recover data that was broadcast while the client was disabled. The system and method guarantees delivery of data from a server to multiple clients, so that each client has a complete record of data with which to execute further processes and provide reliable, accurate analyses. The server broadcasts data in single point-to-multipoint transmissions for receipt by a plurality of clients. In addition, if a client is disabled during the transmission, the system and method provide a means for the client to identify and recover the data the client missed while it was off line.

In a representative embodiment of the present invention, the system includes a transfer server, a plurality of clients in communication with the transfer server, and an archive in communication with the transfer server and the plurality of clients. The transfer server receives data packets from a data source, uniquely identifies each data packet, and broadcasts (or multicasts) the data packets to the plurality of clients and the archive. Each client of the plurality of clients contains a client component that receives the data broadcast from the transfer server and an application-specific component that processes the data in a task-specific way. The client component also identifies missing data and communicates with the archive to recover the missing data.

The archive contains a client component that receives the data broadcast from the transfer server and responds to the transfer server with an acknowledgement ("ACK") indicating that the data has been received. The archive also contains an archiving process component that stores the data received from the transfer server and communicates with clients in handling requests for the archived data.

Together, the above components distribute data to a plurality of clients, contemporaneously store the data, and provide means for re-transmitting the data to clients that were disabled during the original distribution. According to a representative embodiment of the present invention, the method for distributing and recovering the data includes attaching a unique sequence number to a packet of data, broadcasting the data packet from the transfer server to the plurality of clients and the archive, storing the data packet in the archive (or the transfer server, as a back-up), and monitoring at the plurality of clients the sequence numbers of received data packets. In monitoring the sequence numbers, if a client discovers an absence of one or more sequence numbers, the client queries the archive (or the transfer server) to re-transmit the data packet(s) having the missing sequence number(s). In response, the archive (or the transfer server) re-transmits the data packet(s) in a point-to-point communication to the requesting client. In this manner, only the particular requesting client receives the data, thus avoiding the other clients' receiving the data a second time.

In the context of the present invention, it is assumed that all clients require the data packets that are transmitted by the server. Thus, if a client identifies a missing sequence number, it recognizes that it is missing required data packets. In this manner, a client never requests the re-transmission of data packets it does not need. In addition, for purposes of the present invention, the transmissions of the data packets are either always broadcasts to all clients or are always multicasts to the same subset of clients. These methods of transmission ensure that the receiving clients always expect to receive data packets in sequence. As used herein, "broadcast" covers these two methods of transmission.

In a representative embodiment of the present invention, clients can be dynamically added to or removed from a system. New clients that are added to a system can be configured to pick up the data stream from the time that they are added, and not to request all data transmitted prior to that time. Alternately, new clients can be configured to retrieve all data transmitted prior to the time they are added, and to pick up the data stream from that time forward. As another option, new clients can be configured to retrieve certain gaps of data transmitted during certain previous times, and to pick up the data stream from the time they are added.

Accordingly, an object of the present invention is to guarantee reliable data transfers.

Another object of the present invention is to minimize network usage.

Another object of the present invention is to distribute data from one sender location to multiple receiving locations, and to enable a receiving location to recover data previously distributed when the receiving location was disabled.

Another object of the present invention is to accommodate a dynamic client set, such that clients can be added to or removed from a system with no administrative overhead.

These and other objects of the present invention are described in greater detail in the detailed description of the invention, the appended drawings, and the attached claims.

DETAILED DESCRIPTION OF THE INVENTION

The present invention is a system and method for distributing data from a server to clients and for recovering data for disabled clients that miss the original data distribution.

Figure 1:
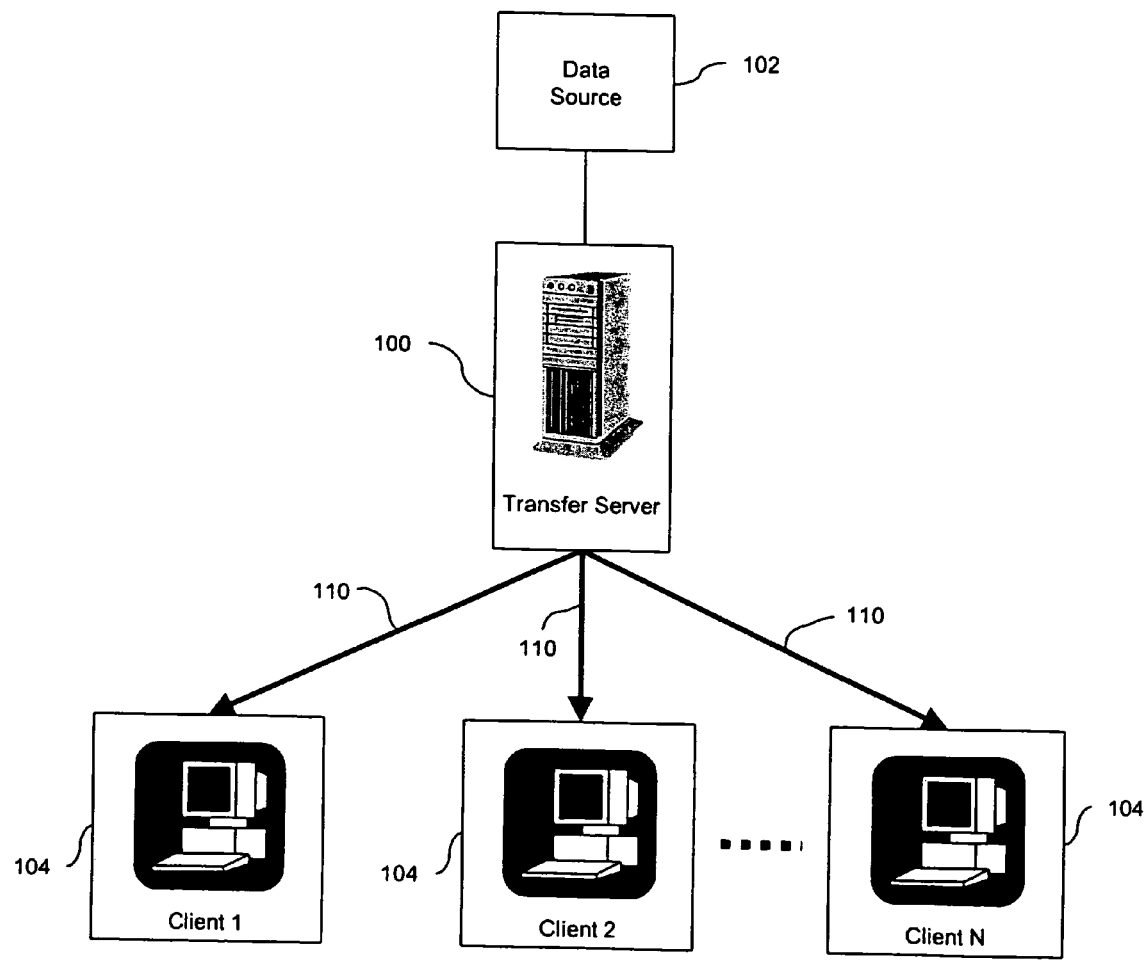
FIG. 1 is a schematic diagram of a prior art client-server architecture in which a server distributes data to clients using separate point-to-point communications.
Figure 2:
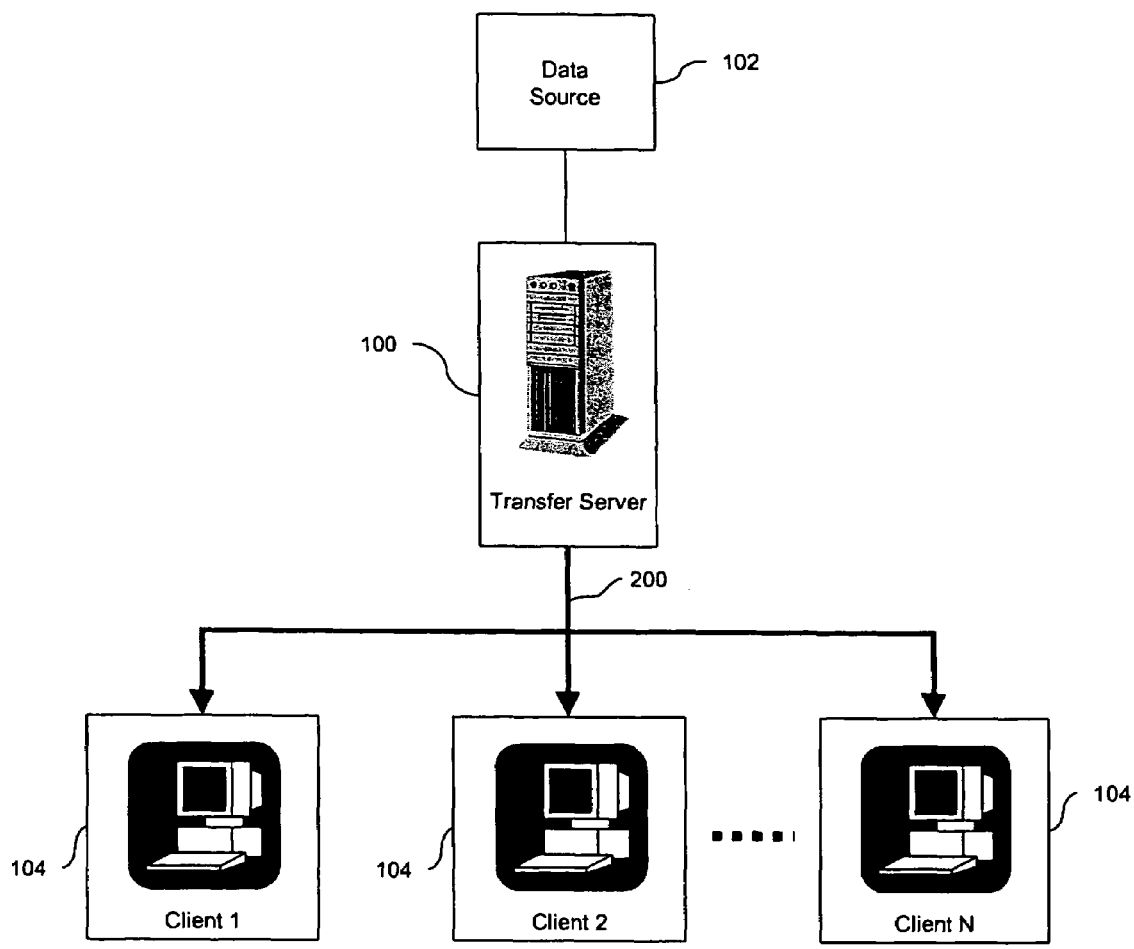
FIG. 2 is a schematic diagram of a prior art client-server architecture in which a server broadcasts data to clients.
Figure 3:
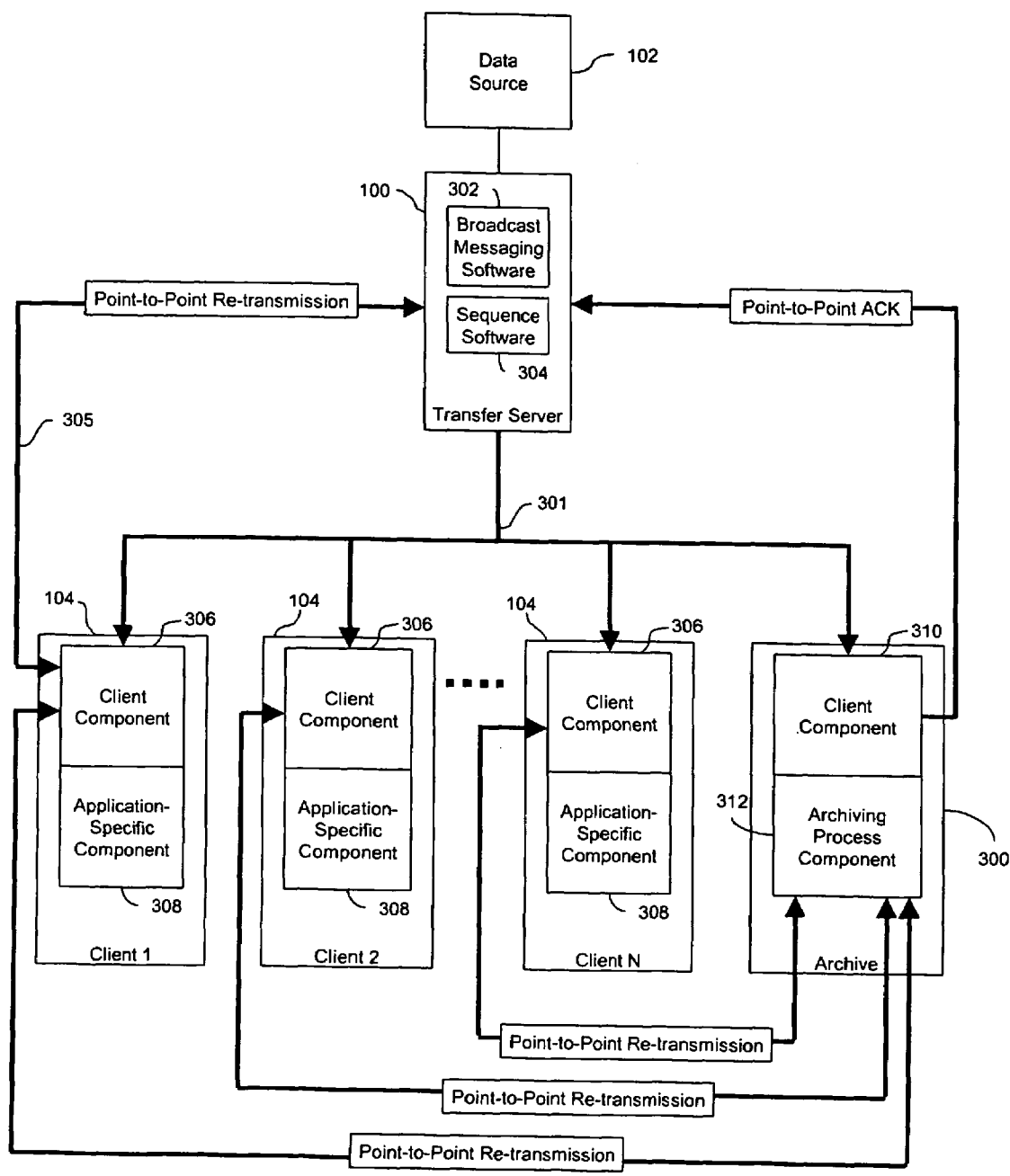
FIG. 3 is a schematic diagram of a client-server architecture according to a representative embodiment of the present invention.

FIG. 3 illustrates a representative embodiment of the present invention including a data source 102, a transfer server 100 in communication with data source 102, a plurality of clients 104 in communication with transfer server 100, and an archive 300 in communication with transfer server 100 and the plurality of clients 104. In terms of client-server architecture, transfer server 100 functions as a server in relation to the plurality of clients 104 and archive 300. In addition to functioning as a client of transfer server 100, archive 300 also functions as a server in relation to the plurality of clients 104.

Data source 102 provides the raw data that is to be manipulated and analyzed by front-end computers (i.e., clients 104 and archive 300). Data source 102 can provide this raw data in large, periodic data file transfers. However, to minimize network usage and to realize the full benefits of the present invention, data source 102 preferably provides the raw data continuously so that the data can be analyzed by clients 104 in near real time.

For example, data source 102 could be the network control center of a digital wireless packet switching network, providing continuous performance log files including data such as network capacity, regional traffic data, and alarms indicating network areas experiencing overload conditions. Providing continuous performance log files enables clients to analyze and present network data to system engineers in near real time, so that the engineers can identify and correct problems without undue delay.

Transfer server 100 receives the raw data from data source 102 and transmits the data in a broadcast 301 to the plurality of clients 104 and archive 300. To complete this transmission, transfer server 100 contains broadcast messaging software 302, such as TIB Rendezvous™. Broadcast messaging software 302 also allows transfer server 100 to receive messages broadcast from other networked components, e.g., clients 104 and archive 300.

Transfer server 100 also contains sequence software 304, which attaches a unique sequence number to each data packet that transfer server 100 receives from data source 102. Transfer server 100 attaches the sequence number before broadcasting the data packet to the plurality of clients 104. The unique sequence number identifies each data packet received from data source 102 and denotes the order in which each data packet is broadcast in relation to other data packets. The unique sequence number contains enough digits to ensure that no two data packets receive the same sequence number, i.e., the sequence numbers increase without turning over and re-starting at zero. For example, a 32-bit sequence number ranging from 0 to 4,294,967,295 would handle data received from the network control center of a digital wireless packet switching network, such as Mobitex, for over 1,000 years at a rate of approximately 10,900 data packets per day.

Transfer server 100 is also capable of point-to-point transmissions with archive 300, using broadcast messaging software 302 or another suitable communication protocol, such as TCP/IP. After each broadcast, transfer server 100 listens for an acknowledgement from archive 300, indicating that the data was received by archive 300. If transfer server 100 does not receive an acknowledgement, transfer server 100 records the broadcast data in its own memory storage device and reports the failure of archive 300 to a system administrator. Preferably, the memory storage device of transfer server 100 has enough capacity to take over the storage functions of archive 300 for a duration at least as long as the time that the system administrator typically takes to fix archive 300.

Although not critical to the present invention, transfer server 100 is preferably also capable of point-to-point transmissions with clients 104, using broadcast messaging software 302 or another suitable communication protocol. This communication allows transfer server 100 to respond to client requests for missed data, for occasions when transfer server 100 has stored the data packets instead of archive 300, or when archive 300 is off line and not responding to client requests for missed data packets (described in more detail below). FIG. 3 only shows this communication link 305 between client 1 and transfer server 100 for clarity. However, it should be understood that communication link 305 is present for all of clients 104.

The plurality of clients 104 each contains a client component 306 and an application-specific component 308. Client component 306 is adapted to receive messages from transfer server 100 using broadcast messaging and to send messages to transfer server 100 using broadcast messaging or point-to-point communication. Client component 306 is also adapted to communicate with archive 300 using point-to-point communication, or alternatively, using broadcast messaging. For broadcast messaging, client component 306 is provisioned with software compatible with broadcast messaging software 302. Preferably, this compatible software is TIB Rendezvous™. For point-to-point communication with archive 300, client component 306 can use the software compatible with broadcast messaging software 302, or can use any other suitable communication software. Alternatively, instead of point-to-point communication with archive 300, client component 306 could use point-to-multipoint (e.g., broadcast) communication in which subject-based addressing would ensure that only the intended recipient (archive 300) would read the message.

According to subject-based addressing technology, neither servers nor clients communicate directly. Rather, the servers and clients communicate using subjects in messages. These subjects are strings of text, which indicate to which client or clients the message is intended. Clients receive the message and check for a particular subject. A client is configured to recognize subjects pertinent to its operation, e.g., if a client is responsible for monitoring and analyzing the rate at which data packets are traveling through network device A, the client would pull data from all messages having the subject "device A traffic rate." If a client does not recognize the subject, the client simply ignores the message.

Client component 306 also contains software that writes data packets to the client, reads sequence numbers attached to the data packets, determines if any sequence numbers have been missed, and communicates with archive 300 to request and receive data packets having the missed sequence numbers. In receiving data packets from transfer server 100, if client component 306 discovers an absence of one or more sequence numbers, client component 306 queries archive 300 to request a re-transmission of the data packets having the missing sequence numbers. If archive 300 is off line and unable to respond to the query, client component 306 sends the same query to transfer server 100, which assumes the storage functions of archive 300 if archive 300 is off line, as described above. If transfer server 100 also does not respond, then client component 306 periodically retries the queries to archive 300 and transfer server 100 and/or notifies the system administrator of the data flow interruption.

According to a representative embodiment of the present invention, client component 306 stores the data packets on a disk. Preferably, the stored data packets include the unique sequence numbers, which can be stored, for example, as part of the file name of the data packet or as part of the data packet contents. Alternatively, client component 310 could act as an application program interface (API) for a program that processes the data packets, such that the data packets are delivered directly to the processing program, rather than being stored on disk.

Client component 306 determines if sequence numbers have been missed in the following manner. When client component 306 receives a first data packet, it records the first data packet and a first unique sequence number associated with the first data packet. Next, when the client component 306 receives a second data packet, it records the second data packet and a second unique sequence number associated with the second data packet. Client component 306 then compares the first unique sequence number to the second unique sequence number. If the second unique sequence number is the next number in sequence after the first unique sequence number, e.g., if the first unique sequence number plus one equals the second unique sequence number, then client component 306 determines that it has not missed a data packet. If the second unique sequence number is not the next number in sequence after the first unique sequence number, then client component 306 determines that there is an absence of one or more sequence numbers, and that it has missed one or more data packets.

According to a representative embodiment of the present invention, individual clients can be dynamically added to or removed from multiple clients 104. New clients can be configured to pick up the data stream from the time that they are added, and to not request all data transmitted prior to that time. For example, a new client can be configured to treat the next unique sequence number it receives as the first sequence number, such that there are no previous sequence numbers to request. Optionally, new clients can be configured to retrieve all data transmitted prior to the time they are added. For example, a new client can be configured to read the next unique sequence number it receives and to request all previous sequence numbers back to the sequence number of the first broadcast data packet (as designated, for example, by the system administrator). As another option, new clients can be configured to retrieve certain gaps of data missed during certain periods prior to the time they are added.

In this dynamic client set, a system administrator can activate, deactivate, or disable clients at will, without requiring administrative changes at transfer server 100. As any individual client of the multiple clients 104 is activated, deactivated, or disabled, the remaining clients of the multiple clients 104 and the rest of the system components function normally.

Application-specific component 308 of each client of the plurality of clients 104 processes the data provided by data source 102. Application-specific component 308 executes tasks specific to each client of the plurality of clients 104. As an example, in a digital wireless packet switching network, application-specific component 308 could analyze network routing and present histograms trending the data traffic through a particular switch. Application-specific component 308 of another client could take the same network routing data and present histograms trending the overall capacity of the digital wireless network. To provide reliable, up-to-date analyses of data, application-specific component 308 must receive all of the continuously broadcast data, even if the client of application-specific component 308 temporarily goes off line. Thus, application-specific component is the impetus behind providing accurate means for recovering data for disabled clients.

Archive 300 provides this means for recovering data. Archive 300 contains a client component 310 and an archiving process component 312. Client component 310 is adapted to interface with transfer server 100 using both broadcast messaging and point-to-point communication. For broadcast messaging, client component 310 is provisioned with software compatible with broadcast messaging software 302. Preferably, this compatible software is TIB Rendezvous™. For point-to-point communication, client component 310 can use the software compatible with broadcast messaging software 302, or can use any other suitable communication software.

Client component 310 of archive 300 also contains software that writes data packets and their attached sequence numbers to archive 300, and, in response to receiving such data packets from transfer server 100, returns a point-to-point acknowledgement to transfer server 100 indicating the sequence number of the received data packet. Optionally, client component 310 also deletes or compresses data packets that have been stored on archive 300 more than a certain length of time, e.g., a week, to free storage space for new data packets being written to archive 300. Archive 300 contains enough storage capacity to allow for data recovery after a client has been off line. The amount of storage capacity necessarily depends on factors such as the transfer rate of data packets and the typical length of time a client is off line. Although FIG. 3 shows client component 310 as a part of archive 300, client component 310 could be a separate program, or could be a specially configured version of client component 306, since client component 306 and client component 310 perform similar functions. For example, client component 310 could be the software of client component 306 modified to provide a point-to-point acknowledgement back to transfer server 100.

Archiving process component 312 of archive 300 contains software that listens for a query from a requesting client of the plurality of clients 104, reads the sequence numbers referenced in the query, retrieves from archive 300 the data packets corresponding to the referenced sequence numbers, and returns the data packets to the requesting client. Archiving process component 312 uses broadcast/multicast communication to receive the query, and uses point-to-point communications to return the data packets. Alternatively, instead of point-to-point communication with clients 104, archive processing component 312 could use point-to-multipoint (e.g., broadcast) communication in which subject-based addressing would ensure that only the intended recipient (the requesting client of clients 104) would read the message.

Optionally, the software archiving process component 312 would also determine when to delete or compress data packets stored on archive 200, e.g., if the free disk space of the archive 300 is less than 100 MB, then the archiving process component 312 could delete data packets that have been stored on the archive 300 for longer than one week. The software could simply delete the data packets, or could transfer the files to another machine (not shown) for long-term or permanent storage, e.g., to a compact disc (CD) writer. The disk and the CD are each non-limiting examples of computer readable media.

As stated above, both client component 310 and archiving processing component 312 can delete or compress data packets of archive 300. Preferably, however, archiving processing component 312 performs this functions. Optionally, a third process could handle the function.

Although FIG. 3 shows transfer server 100, clients 104, and archive 300 as separate network components, as one of ordinary skill in the art would appreciate, these components or combinations of these components could be a single machine (or single physical computer), depending on software configuration. For example, archive 300 could be a part of transfer server 100, provided, of course, that the hardware of transfer server 100 has the capacity to serve both functions. However, as one of ordinary skill in the art would also appreciate, provisioning these network components on multiple machines provides better redundancy and risk-spreading.

In addition, although FIG. 3 shows separate software components for transfer server 100, clients 104, and archive 310, one of ordinary skill in the art would appreciate that these individual software components could be single software programs performing the functions of the separately shown and described components. For example, client component 310 and archiving process component 312 of archive 300 could be a single software program. Likewise, client component 306 and application-specific component 308 of clients 104 could be a single software program, as could broadcast messaging software 302 and sequence software 304 of transfer server 100.

Figure 4A:
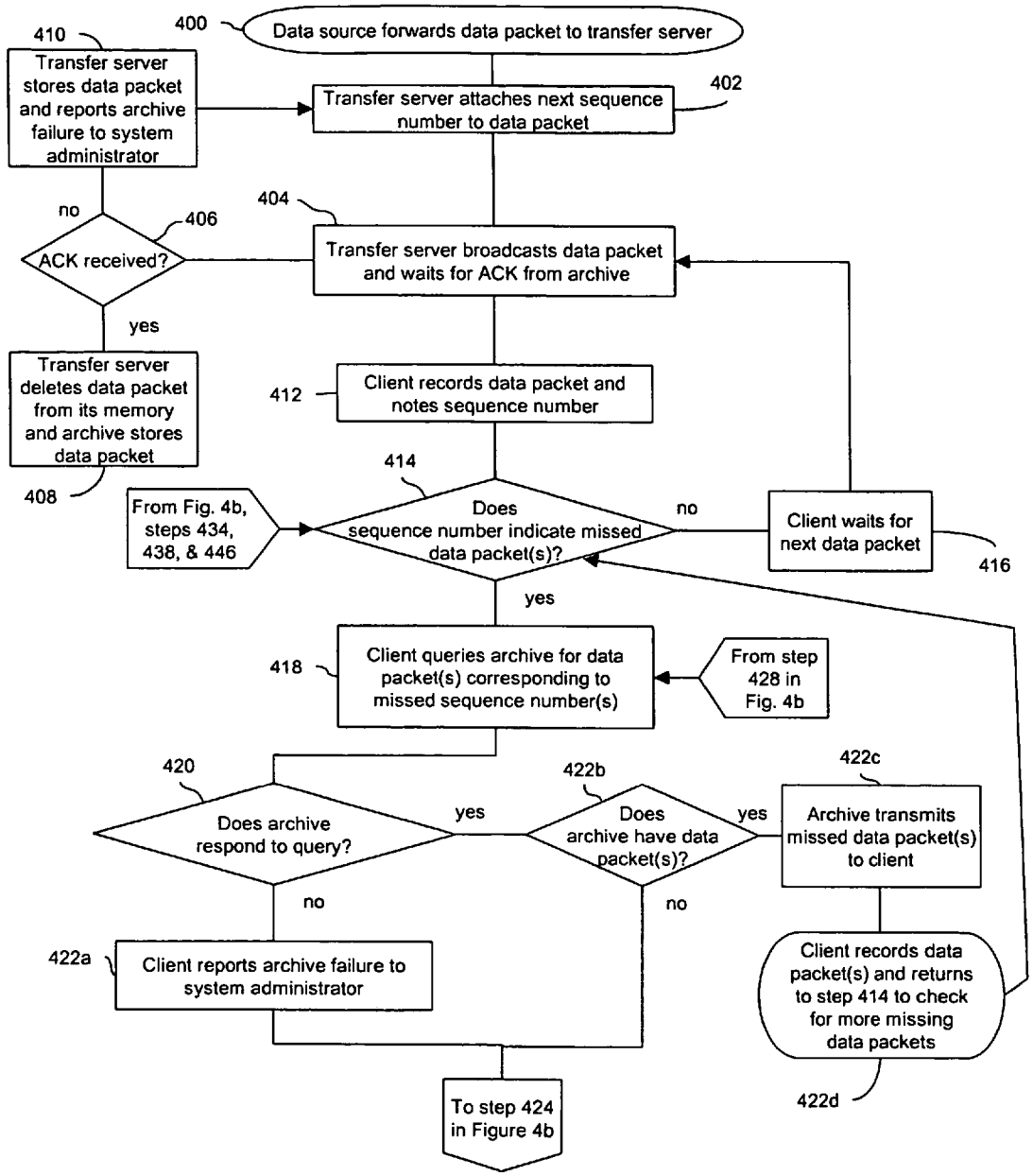
FIGS. 4a and 4b are flow charts describing a method for distributing and recovering data, according to a representative embodiment of the present invention.
Figure 4B:
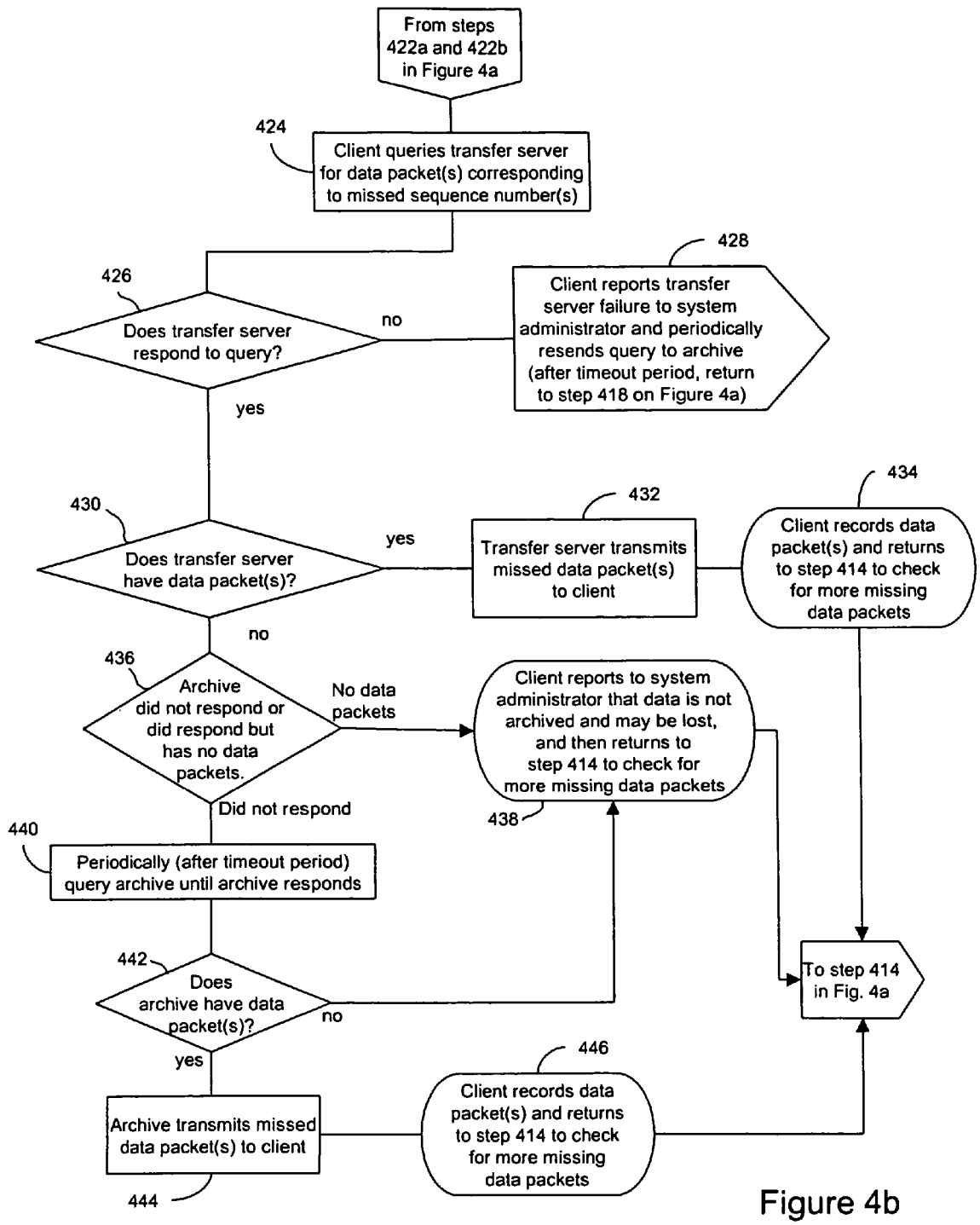

FIGS. 4a and 4b are flow charts outlining a representative embodiment of the method of the present invention. While the system operation described herein and illustrated in the diagram and flowchart contains many specific details, these details should not be construed as limitations on the scope of the invention, but rather as examples of representative embodiments thereof. As would be apparent to one of ordinary skill in the art, many other variations on the system operation are possible, including differently grouped and ordered method steps. For example, although the representative embodiments below describe certain data recovery algorithms, as one of ordinary skill in the art would appreciate, other more comprehensive data recovery algorithms are also applicable. Accordingly, the scope of the invention should be determined not by the embodiments illustrated, but by the appended claims and their equivalents.

In FIG. 4a, the method commences in step 400 with data source 102 forwarding a data packet to transfer server 100. In step 402, transfer server 100 receives the data packet and attaches the next sequence number to the data packet. The sequence number uniquely identifies the data packet and denotes the order in which transfer server 100 broadcasts data packets. The sequence number is attached to the data packet by inserting it into a field in the data packet, or by appending it to the file name.

In step 404, transfer server 100 broadcasts the data packet with its attached sequence number to clients 104 and archive 300. Then, in step 406, transfer server 100 waits for an acknowledgement from archive 300 indicating that archive 300 has received the data packet.

If transfer server 100 receives the acknowledgement, transfer server 100 recognizes that archive 300 has received the data packet and will store the data packet. Thus, in step 408, transfer server 100 deletes the data packet from its memory, and archive 300 records the data packet in its memory storage.

As an added layer of reliability, if transfer server 100 does not receive the acknowledgement, transfer server 100 assumes that archive 300 is off line, and therefore records the data packet in its memory storage, as shown in step 410. After storing the data packet, transfer server 100 returns to step 402 in anticipation of receiving the next data packet.

Transfer server 100 must have enough memory storage to take over the storing functions of archive 300 for a duration comfortably longer than the typical length of time that archive 300 might be unavailable. For example, if software lock-ups on archive 300 typically require two hours to reset, transfer server 100 may have a memory storage capable of storing eight hours of data packets at the usual data transfer rate. Using transfer server 100 as a secondary source for recovered data greatly improves the reliability of the system and minimizes the possibility of lost data.

While either transfer server 100 or archive 300 is storing the data packet, in step 412, each client of clients 104 is also recording the data packet along with its attached sequence number. As described above, the sequence number indicates the order in which data packets are broadcast. Thus, if a client determines that the sequence number has skipped that order, then the client knows that it has missed the transfer of a certain number of data packets. For example, if the last sequence number recorded by the client was 785, and the client receives a data packet with the sequence number 790, then the client knows that it is missing four data packets: 786, 787, 788, and 789.

Using this sequence number logic, in step 414, the client determines if the sequence number indicates that data packet(s) have been missed. If the sequence is correct, indicating that no data packets have been missed, in step 416, the client simply waits for the next data packet. The method flow, therefore, returns to step 404, in which transfer server 100 broadcasts the next data packet and the process continues.

If, in step 414, the client determines that a data packet is missing, then, in step 418, the client queries archive 300. The query references the sequence numbers that the client is missing and requests that archive 300 re-transmit the data packets corresponding to those missed sequence numbers.

In step 420, the client waits for a response from archive 300 to determine if archive 300 is currently on line. If archive 300 does not respond, the client reports the failure of archive 300 to the system administrator in step 422a. The system administrator can then act quickly to restore archive 300, so that clients can retrieve archived data from archive 300, and so that archive 300 can resume its data storage functions and relieve transfer server 300 of its back-up duties. After reporting the failure to the system administrator, the client queries transfer server 100 for the data packets corresponding to the missing sequence numbers (step 424 in FIG. 4b).

If, in step 420, archive 300 responds to the client, then the client determines if archive 300 has the data packets that the client is requesting (in step 422b). Archive 300 provides in the response itself an indication of whether archive 300 has the requested data packets. For example, archive 300 responds by forwarding the requested data packets (indicating that it does have the data packets) or by sending a NAK message (i.e., a negative acknowledgement message indicating that it does not have the data packets).

If archive 300 does have the requested data, in step 422c, archive 300 transmits the missed data packets to the client. As described above, this transmission is preferably a point-to-point communication between the client and archive 300, or alternatively, the transmission could be a broadcast that only archive 300 recognizes and reads, using subject-based addressing techniques. In response, in step 422d, the client records the data packets to complete its record of stored data and checks to see if more data packets are missing by returning to step 414.

If archive 300 responds ("yes" in step 420) but does not have the requested data ("no" in step 422b), then the client queries transfer server 100 for the data packets corresponding to the missing sequence numbers, in step 424 (FIG. 4b). This condition would occur if archive 300 were currently on line, but had previously been off line at the same time the client missed the broadcast data packets. Because archive 300 was off line, those data packets were stored in transfer server 100.

As shown in FIG. 4b, after the client issues the query in step 424, the client waits for a response from transfer server 100 in step 426. If transfer server 100 does not respond to the query, in step 428, the client periodically resends the query to archive 300 and transfer server 100 by returning to step 418.

The client resends the query after a reasonable timeout period to avoid issuing too many requests. The client also notifies the system administrator of the failure of transfer server 100.

If, in step 426, transfer server 100 does respond to the client's query, in step 430, the client determines if transfer server 100 has the requested data packets. Transfer server 100 provides in the response itself an indication of whether transfer server 100 has the requested data packets. For example, archive 300 responds by forwarding the requested data packets (indicating that it does have the data packets) or by sending a NAK message.

If transfer server 100 does have the requested data packets, then transfer server 100 transmits the missed data packets to the client in step 432. As described above, this transmission is preferably a point-to-point communication between the client and transfer server 100, or alternatively, the transmission could be a broadcast that only transfer server 100 recognizes and reads, using subject-based addressing techniques. In response, in step 434, the client records the data packets to complete its record of stored data and then checks to see if more data packets are missing by returning to step 414 (FIG. 4*a*).

If, in step 430, transfer server 100 reports that it does not have the requested data packets, in step 436, the client acts in one of two ways depending on whether, in the prior step 420, archive 300 did not respond, or did respond but did not have the requested data packets.

If archive 300 did respond but did not have the data packets, then client recognizes that neither transfer server 100 nor archive 300 has the missing data packets. Therefore, in step 438, the client reports to the system administrator that the requested data packets are not archived and may have been lost. In light of this notification, the system administrator can pursue alternate methods for recovering the data packets, e.g., by manually copying the data packets from a client that received the data packets when they were originally broadcast. Also, in step 438, the client checks to see if more data packets are missing by returning to step 414 (FIG. 4*a*).

If archive 300 (in step 420) did not respond, then the client recognizes that, although transfer server 100 does not have the requested data packets, archive 300 might still have them, but may be unable to respond because it is currently off line. Therefore, in step 440, the client periodically resends the query to archive 300 until archive 300 comes back on line and responds. The client resends the query after a reasonable timeout period, to avoid issuing too many requests.

Once archive 300 responds, it reports to the client whether it possesses the requested data packets, in step 442. If archive 300 does not have the requested data packets, then the client recognizes that neither transfer server 100 nor archive 300 has the missing data packets. Therefore, returning to step 438, the client reports to the system administrator that the requested data packets are not archived and may have been lost, so that the system administrator can pursue alternate methods for recovering the data packets. The client also checks for more missing data packets by returning to step 414 (FIG. 4*a*).

If, in step 442, archive 300 does have the requested data packets, then archive 300 transmits the missed data packets to the client in step 444. This transmission is preferably a point-to-point communication between archive 300 and the client, or alternatively, the transmission could be a broadcast that only the client recognizes and reads, using subject-based addressing techniques. In response, in step 446, the client records the data packets to complete its record of stored data and returns to step 414 (FIG. 4*a*) to monitor for more missing data packets.

In the end, the system and method of the present invention ensure that a client eventually receives a full record of data, so that client can provide timely and accurate analyses for a network user.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for data distribution and recovery comprising:
    attaching unique sequence numbers to data packets by a server;
    broadcasting the data packets from the server to a plurality of clients and an archive;
    storing the data packets with the attached unique sequence numbers that have been received at the archive, wherein a communication path of the data packets received at the archive is at least partly distinct from a communication path of the data packets broadcasted to the plurality of clients, and wherein at least one client monitors for a missing sequence number by:
        receiving a first data packet and recording a first unique sequence number associated with the first data packet,
        receiving a second data packet and recording a second unique sequence number associated with the second data packet,
        comparing the first unique sequence number to the second unique sequence number, and
        if the second unique sequence number is not in sequence after the first unique sequence number, then determining that the client is missing the sequence number;
    receiving by the archive a first query via point-to-point communication from the at least one client requesting re-transmission of a missing data packet having the missing sequence number;
    receiving by the server a second query from the at least one client requesting re-transmission of a missing data packet having the missing sequence number, if the archive fails to respond to the first query or if the archive does not have the missing data packet; and
    transmitting to the client the missing data packet.

2. The method of claim 1, wherein if the archive has the missing data packet, then the archive transmits the missing data packet to the client.

3. The method of claim 1, wherein if the server has the missing data packet, then the server transmits the missing data packet to the client.

4. A system for data distribution and recovery comprising:
a server computer having broadcast messaging software;
a plurality of clients computers and an archive computer in communication with the server computer through the broadcast messaging software;
the server computer broadcasting data packets to the plurality of client computers and the archive computer, wherein the archive computer comprises a client component and an archiving process component,
wherein the client component is adapted to interface with the computer server, is adapted to receive and store the data packet broadcast by the server computer and the unique sequence number attached to the data packet, and
wherein the archiving process component is adapted to listen for a query for a missing data packet from a requesting client computer of the plurality of computer clients, to read a referenced sequence number of the query, to retrieve a data packet corresponding to the referenced sequence number, and to return the data packet corresponding to the referenced sequence number to the requesting client computer; and
the archive computer in communication with both the plurality of client computers and the server computer, wherein a communication path of the data packets received at the archive computer is at least partly distinct from a communication path of the data packets broadcasted to the plurality of clients computers, and wherein each client of the plurality of client computers:
receives a data packet broadcast by the server computer,
compares a unique sequence number to a last received unique sequence number, wherein in the last received unique sequence number corresponds to a data packet last received before the data packet; and
if the unique sequence number is not in sequence after the last received unique sequence number then determining that a previous data packet is missing
if the previous data packet is missing, requests the previous data packet from the archive computer via point-to-point communication between the client computer and the archive computer, and
if the previous data packet is unavailable at the archive computer then requests the previous data packet from the server computer.

5. The system of claim 4, wherein the archive is also in communication with the server through point-to-point communication, and wherein the archive provides the server with an acknowledgement to indicate that the archive has received data broadcast by the server.

6. The system of claim 4, wherein each client of the plurality of clients requests the previous data packet through a point-to-point communication with the archive.

7. The system of claim 4, wherein the server stores the data packet if the server does not receive an acknowledgement that the data packet has been stored at the archive.

8. The system of claim 4, wherein the client component and the archiving component are separate software programs.

9. The system of claim 4, wherein the client component is identical to software provisioned on the plurality of clients, except that the client component is modified to provide an acknowledgement to the server.

10. The system of claim 4 wherein the plurality of clients is a dynamic client set in which individual clients are dynamically added to or removed from the plurality of clients without requiring administrative changes at the server, wherein new clients are configured to pick up broadcasts from the server from a time that the new clients are added, and are configured not to request data packets transmitted prior to that time.

11. The system of claim 4, wherein the data packet and the previous data packet include their unique sequence numbers, and wherein the unique sequence numbers are stored as part of a data packet file name.

12. The system of claim 4, wherein the client acts as an application program interface for a program that processes data packets, such that the data packets are delivered directly to the processing program.

13. The system of claim 4, wherein the unique sequence number is a 32-bit sequence number.

* * * * *